July 24, 1956 A. W. MEIER 2,756,047
ANTI-FRICTION DEVICES FOR LEAF SPRINGS
Filed March 31, 1952

AXEL W. MEIER.
INVENTOR.

BY George W. Wilson.
ATTORNEY.

United States Patent Office 2,756,047
Patented July 24, 1956

2,756,047

ANTI-FRICTION DEVICES FOR LEAF SPRINGS

Axel W. Meier, Los Angeles, Calif.

Application March 31, 1952, Serial No. 279,643

2 Claims. (Cl. 267—49)

My invention relates to anti-friction devices adapted to be inserted between the leaves of leaf-springs of the type used, for instance, in automobiles and trucks but of general utility wherever leaf-springs are utilized.

The device is of the kind having anti-friction means mounted on the surface of a leaf rolling against the underside of the leaf above it.

The general object of my invention is to improve the action of springs of the kind referred to, and to provide an improvement over the devices forming the subject matter of my co-pending U. S. patent application Serial No. 83,037, filed March 23, 1949, now abandoned.

Various constructions have been proposed to improve leaf-springs by lessening the increased friction between the leaves of such springs after a relatively short period of use, due to the formation of rust, hardening of lubricant, or entry of particles of grit and the like between the leaves of the spring.

Some of such proposed constructions were complicated, and others subject to malfunctioning from one cause or another.

It is, therefore, an object of my invention to provide a simple and rugged fitting adapted to be inserted between the ends of adjoining leaves of a leaf-spring which device will operate efficiently over long periods of time to greatly reduce the friction between the spring leaves.

It is a further object of my invention to provide an anti-friction fitting or device for use in leaf-springs which is arranged to retain the grease injected between the leaves of a leaf-spring from time to time in the routine maintenance given to such springs.

Another object of my invention is to provide an anti-friction device adapted to be positioned between the leaves of a leaf-spring, and retained in position, without the use of additional parts or special tools.

An important object of my invention is to provide an anti-friction device of the kind above referred to which is comprised of only a body portion and rollers positioned thereby and so arranged that it may be produced by a minimum of operations and in large quantity with consequent low cost of production.

Still other objects and features of my invention will hereinafter appear from the following specification read in conjunction with the accompanying drawings which describe and illustrate embodiments of the invention at present deemed preferable by me.

Description of drawings

In the drawings:

Referring now to Fig. 1, the numeral 9 indicates generally the device of my invention which comprises a plate 10 of sheet metal which is adapted to be inserted between a pair of leaves 11 and 12, Fig. 4, of a leaf-spring such as that of an automobile.

The plate is preferably rectangular and is provided with edge portions 13 bent substantially normal to the plane of the plate and adapted to engage with the edge of a spring leaf to prevent the device from working sideways out of position.

Preferably but not necessarily the transverse edges 14, 15 which lie flat against the surface of one leaf are provided with short down turned lips 16 adapted to help in preventing any slight tendency of the device to creep along the spring although it has been found by careful experiment that little or no lengthwise movement of the device occurs in use.

Figure 1:
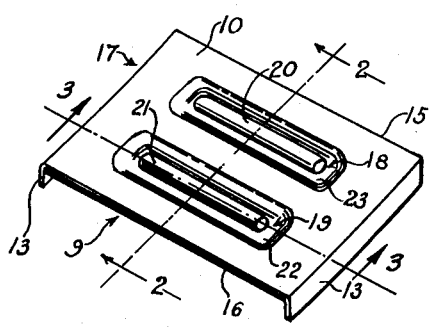
Fig. 1 is a perspective view of a device incorporating my invention.

The plate 10 may also be very slightly curved if desired in a direction lengthwise of the spring as indicated at 17, Fig. 1.

The upper surface of the plate 10 is formed to receive anti-friction members, in the embodiment shown in the drawings, two such areas 18 and 19 being indicated in which small roller or needle bearings 20, 21 are positioned.

Figure 2:
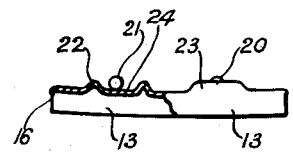
Fig. 2 is a fragmentary cross section on the line 2—2 in Fig. 1.
Figure 3:
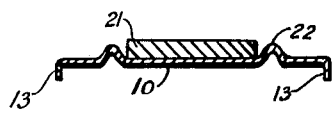
Fig. 3 is a section on the line 3—3 in Fig. 1.
Figure 4:
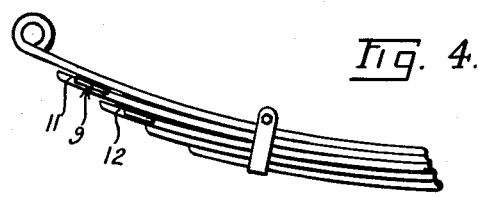
Fig. 4 is a fragmentary side view of a leaf-spring showing the device of my invention in use.

As will be seen in Fig. 1 the sheet 10 is pressed out to provide upstanding ridges 22, 23 completely surrounding the rollers 20, 21. The upstanding ridge encloses a space having a bottom 24 (Figure 2) substantially the same length as the rollers but of a width sufficient to enable the rollers to be rolled by the relative movement of the ends of the spring leaves, which grip the device between them. The bottom 24 provides an uninterrupted smooth rolling surface for rollers 20 and 21.

It will be noted that the ridges 22, 23 project sufficiently above the surface of the plate to prevent the rollers from passing out of the recess formed by each shoulder, the rollers projecting above the top of the shoulder to ensure a free engagement of the rollers with the under surface of the spring leaf.

The lower surface of the bottom 24 preferably lies in the plane of the lower surface of plate 10.

By the described construction, the space enclosed by the projecting ridges 22, 23, in addition to providing a retaining and guiding enclosure for the rollers, also serves to retain lubricant which is from time to time injected between the leaves of a leaf spring in normal maintenance.

Figure 5:
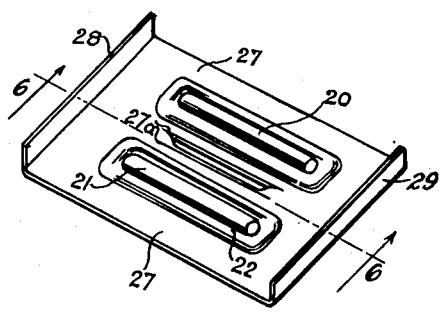
Fig. 5 is a perspective view of another embodiment of my invention.
Figure 6:
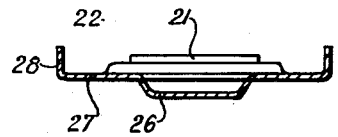
Fig. 6 is a cross section on the line 6—6 in Fig. 5.

The modified form of the device of my invention shown in Figs. 5 and 6 differs from that shown in Fig. 1 in that a center portion 26 of the plate 27 is struck out downwardly, as shown in Fig. 6 to fit into a hole or slot in the spring leaf on which the device is positioned. A slotted spring leaf is not shown in the drawings since such springs are well known in the art.

The center portion 26 may be provided by slotting plate 27 along parallel lines 27a.

The plate 27 is provided with a pair of roller bearing enclosures as described with reference to Fig. 1, but side or edge flanges 28, 29, are shown as extending upwardly, the direction in which the edge flanges extend is a matter of choice.

While I have specifically described and illustrated preferred embodiments of my invention, it is to be understood that various changes in, or modifications of, the embodiments described may be made by those skilled in the art without departing from the scope of the invention as intended to be defined by the appended claims.

What I claim is:

1. An anti-friction device having rollers retained by a member adapted to be positioned between the leaves of a leaf spring and comprising: a metal plate adapted to be inserted between two leaves of a leaf spring; integral side flanges normal to the plate adapted to position it against displacement transversely of the leaf springs, said side flanges being of a height to lie against only the side edges of a single leaf; imperforate bearing surfaces on the upper face of said plate, said plate having upstanding ridges spaced from the margins of the plate and formed from the material of said plate to completely surround said bearing surfaces, and providing a lubricant retaining enclosure; and roller bearings positioned on said bearing surfaces and guided by, and limited in the extent of their travel by said ridges.

2. An anti-friction device having rollers retained by a member adapted to be positioned between leaves of a leaf spring which leaves are provided with openings or recesses therein, comprising: a metal plate adapted to be inserted between two leaves of a leaf spring; integral side flanges normal to the plate adapted to position it against displacement transversely of the leaf spring, said side flanges being of a height to lie against only the side edges of a single leaf; imperforate bearing surfaces on the upper face of said plate, said plate having upstanding ridges spaced from the margins of the plate and formed from the material of said plate to completely surround said bearing surfaces, and providing a lubricant retaining enclosure; a projection extending from the plate outside of the transverse ridges bordering a bearing surface and adapted to engage in the opening or recess in a contiguous spring leaf; and roller bearings positioned on said bearings surfaces and guided by, and limited in the extent of their travel by said ridges.

References Cited in the file of this patent

UNITED STATES PATENTS

| | | |
|---|---|---|
| 1,446,908 | Kunz et al. | Feb. 27, 1923 |
| 1,542,055 | Gullborg | June 16, 1925 |
| 1,588,434 | Ackerman et al. | June 15, 1926 |

FOREIGN PATENTS

| | | |
|---|---|---|
| 574,262 | France | Mar. 27, 1924 |